May 29, 1951 — H. H. HODGIN — 2,554,494

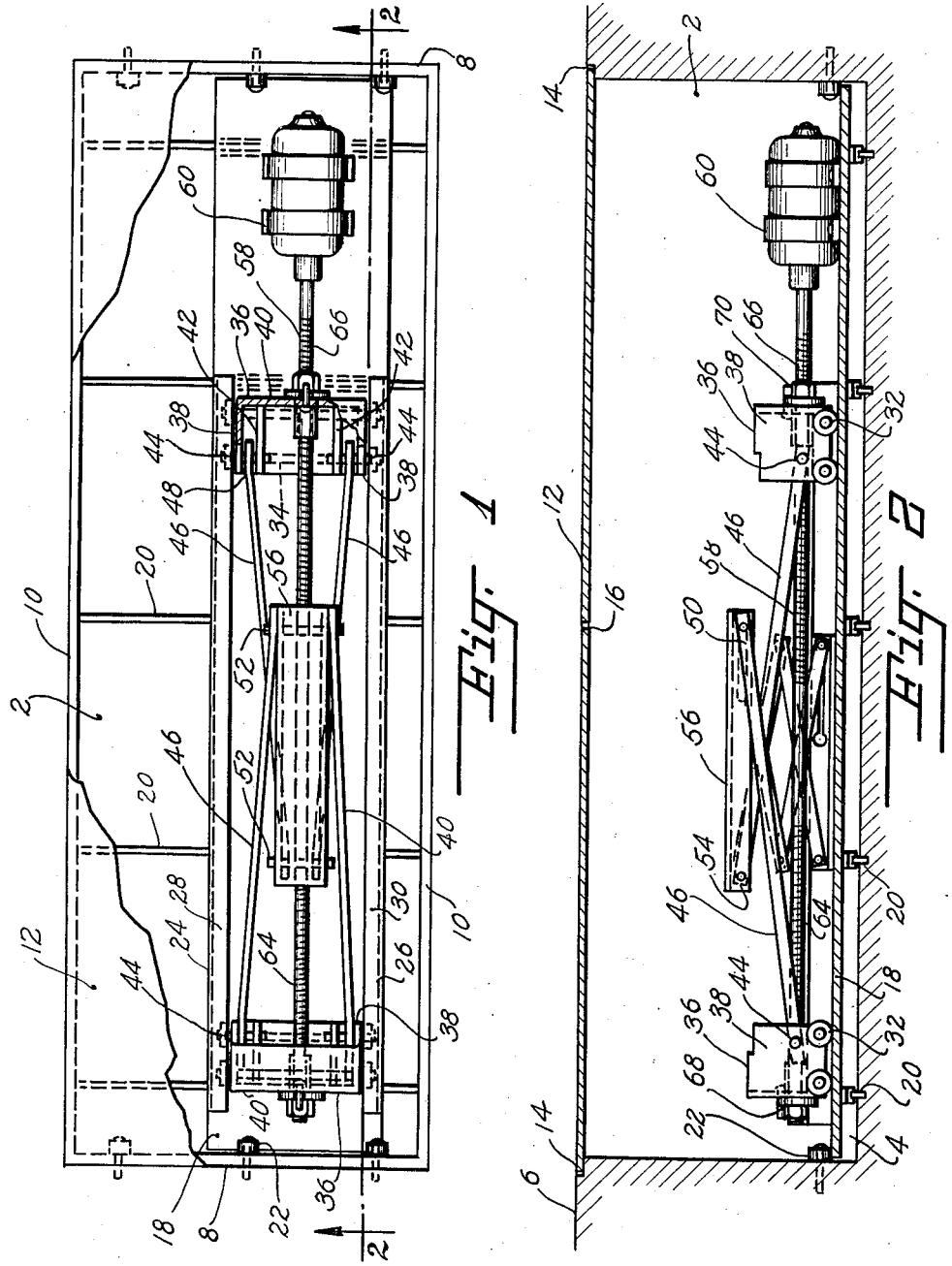

JACK

Filed Nov. 8, 1946 — 2 Sheets-Sheet 2

INVENTOR.
Harald H. Hodgin
BY
McMorrow, Berman and Davidson
ATTORNEYS

Patented May 29, 1951

2,554,494

UNITED STATES PATENT OFFICE 2,554,494

JACK

Harald H. Hodgin, San Jose, Calif.

Application November 8, 1946, Serial No. 708,483

2 Claims. (Cl. 254—122)

1

This invention relates to lifting jacks for use on automobiles and other vehicles.

An object of the invention is to provide an automobile lifting jack which includes a vertically movable platform upon which a portion of an automobile to be raised may rest, a combination of levers and screws for elevating and lowering said platform, and means operable by a source of power such as an electric motor, for causing the platform to be elevated or lowered.

Another object of the invention is to provide an automobile lifting jack which does not require any deep pit for its installation, which does not obstruct the floor when not in use, and which can be covered by a steel plate when not in use, the plate being flush with the floor surface.

A further object of the invention is to provide an automobile lifting jack which is so constructed as to completely avoid drop or creep-down movement unless the drive shaft is turning, thus being quite safe, and which, unlike hydraulic lifts, has no rails or center plate in the way of mechanics.

Still another object of the invention is to provide an automobile lifting jack which is simple in design, inexpensive to manufacture, and which is effective and positive in operation.

Figure 4:
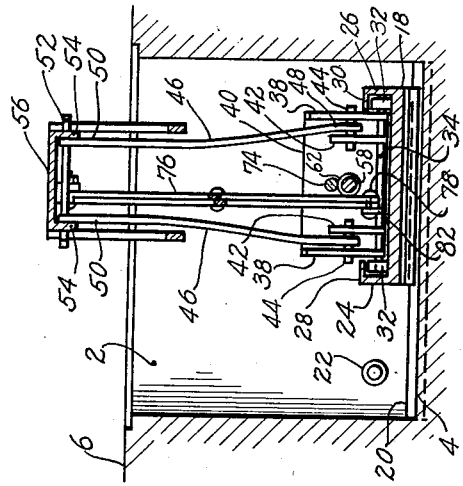
Figure 5:
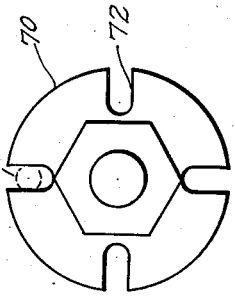
Figure 3:
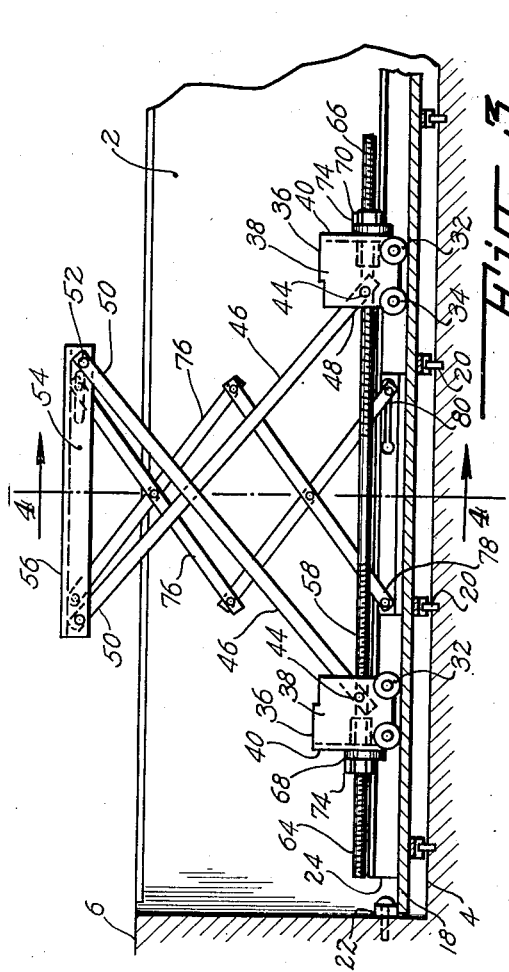
Figure 6:
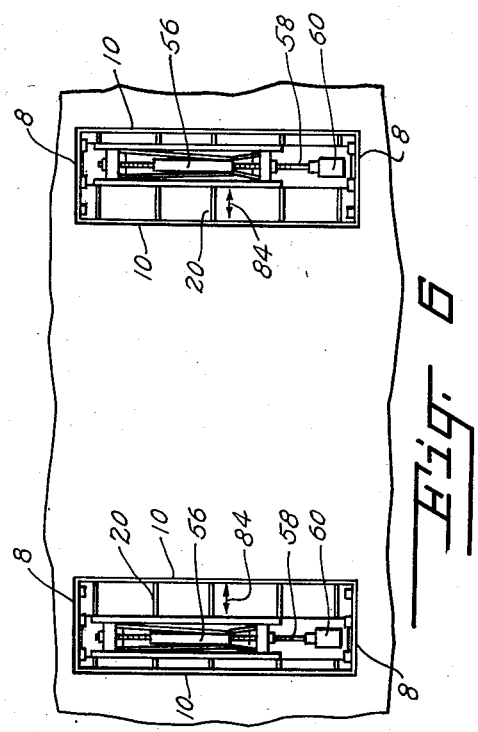

Other objects and advantages of the invention will become apparent from the following description of a preferred embodiment thereof as illustrated in the accompanying drawings, and in which, Figure 1 is a plan view of one of my improved auto jacks installed in place, Figure 2 is an elevational view of the device shown in Figure 1, as seen on line 2—2 of Figure 1, Figure 3 is an elevational view similar to Figure 2, but showing the jack in elevated position, Figure 4 is an end elevational view as seen from line 4—4 of Figure 3, Figure 5 is a face view of an adjusting type drive nut employed in the device, and Figure 6 is a plan view of an installation showing two of the jacks in position for elevating the front and rear portions of an automobile at the same time.

Reference is now had to the details shown in the drawings, in which like reference characters denote similar parts throughout the several views. As illustrated, there is a recess 2 formed in the floor of a garage or other place, the bottom 4 of the recess being below the floor level 6. The recess 2 may be defined by end and side walls 8 and 10 of a box-like casing if desired, the casing being sunk into the ground to provide space for the mechanism. As shown best in Figure 2, a cover plate 12 may be supported along its edges 14 upon the side walls of the recess 2 to close the same, and to permit walking thereon when the jack is not in use. The cover plate may be divided as along line 16 to allow it to be moved easily.

A base plate 18 is supported upon lateral runners or slides 20 resting upon or embedded in the surface 4 of the chamber 2. The base plate is thus slidable upon the slides 20, and may be engaged by safety locks 22 bearing upon its upper surface as it is moved, thus preventing tipping of the base plate and the jack. As best shown in Figure 4, the base plate 18 has upstanding side walls 24 and 26 with inturned flanges 28 and 30 along their upper edges, thus forming inwardly open channels within which ride caster wheels 32, axles 34 extending through the wheels to furnish support for movable carriages 36.

These carriages are thus slidable upon their wheels 32 longitudinally of the base plate 18, that is, from left to right and vice versa as seen in Figures 1, 2 and 3. The carriages have upstanding parallel outer side walls 38 connected at one end by a lateral wall 40, and also have inner side walls 42 between the outer side walls 38 and spaced therefrom and from each other. Pins 44 extend through aligned apertures formed in the inner and outer side walls, there being one pin 44 extending between each set of adjacent inner and outer side walls as best seen in Figure 4.

Lifting arms or levers 46 have apertures formed in their lower end portions 48 as best seen in Figures 1 and 4, to permit the pivot pins 44 to extend therethrough, there being four such lifting arms 46, one pair being pivotally connected at its lower ends to the left hand carriage as seen in Figure 2 and the other pair being pivotally connected similarly to the right hand carriage as seen in the same view. The upper ends 50 of the lifting arms 46 have lateral apertures formed therein for the reception of pivot pins 52 which also extend through aligned apertures formed in the depending side flanges 54 of a platform plate 56 which is thus supported by the lifting arms 46.

It is thus apparent that as the carriages 36 are moved toward each other, the lifting platform 56 is elevated as in Figure 3, and that as they are moved apart, the platform is lowered, as in Figure 2. Movement of the carriages is accomplished by means of a drive shaft 58 which is connected at one end to a motor 60 including suitable reduction gearing by means of which the drive shaft 58 is rotated in one direction or the other as desired. The drive shaft 58 extends through apertures 62 formed in the end walls 40 of the carriages, and has oppositely threaded portions 64 and 66 extending through threaded apertures formed in drive nuts 68 and 70 which bear against the outer surfaces of the end walls 40 of the carriages. It is thus apparent that as the drive shaft 58 is turned in one direction, the drive nuts 68 and 70 are brought closer together, thus forcing the carriages 36 closer together and elevating the platform 56, and that as the shaft 58 is turned in the opposite direction, the drive nuts are moved further apart, thus allowing the weight of the lever arms 46 and the platform 56 to move the carriages further apart, lowering the platform.

Leveling of the platform 56 is accomplished by means of adjustment of the initial positions of the drive nuts upon the drive shaft, and the drive nuts are provided with cut-out portions 72 for the reception of setting pins 74 to keep the drive nuts from rotating relative to the zero settings thus adjusted, the pins 74 extending into apertures formed in the end walls of the carriages.

Sway braces 76 are in the form of lazy tongs with their lower ends 78 and 80 pivotally pinned fixedly and slidably respectively to an upstanding flange 82 forming a part of the base 18, which flange is slotted as shown in Figure 3, to allow the end 80 to slide therein to permit working of the lazy tongs mechanism. The upper ends of the lazy tongs are similarly pivotally pinned fixedly and slidably respectively to a depending flange carried on the underside of the platform 56 which is apertured and slotted similar to the flange 82. This arrangement of sway braces effectively eliminates any sidewise motion of the platform.

It is thus apparent that my improved lifting device has many advantages over lifting devices now in use. Two units of the type shown in Figures 1, 2, 3 and 4 will be required for each installation, that is one to lift up the forward portion of an automobile, and one to lift up the rearward portion thereof. Such an installation is shown in Figure 6, the left hand unit being for the front end and the right hand unit for the rear end. The units are movable in the directions of the arrows 84 to bring them under the proper parts of the cars depending upon the length of wheel base.

The spaced safety stops 22 may, if desired, be replaced by a continuous elongated horizontal stop of angle iron or of rectangular bar stock secured by bolts to the end wall 8 at a height to just clear base 18.

Although I have described a preferred embodiment of my invention in specific terms it is to be understood that various changes may be made in size, shape, materials and arrangement without departing from the spirit and scope of the invention as claimed.

I claim:

1. A heavy duty jack, comprising a substantially horizontal base plate, spaced opposed moveable carriages mounted upon the base plate and having wheels engaging the base plate, means to guide the carriages so that they may be shifted toward and away from each other while remaining in alignment, each carriage including upstanding sides and an end having an opening, a screw threaded nut mounted upon each end adjacent to the opening, an opening rod mounted upon the carriages and connecting them and having oppositely screw threaded portions extending through the openings of the ends and engaging the screw threaded nuts, one end of the operating rod extending outwardly beyond one of the nuts and being turnable to move the carriages toward and away from each other, opposed pairs of crossed lifting arms having their lower ends pivotally connected to the upstanding sides of the carriages, a substantially horizontal lifting platform pivotally connected near its ends to the upper ends of the lifting arms and supported by the lifting arms, and crossed lazy tong levers arranged between the pairs of lifting arms and having their lower ends pivotally connected to the base plate and their upper ends pivotally connected to the lifting platform.

2. A heavy duty jack, comprising a substantially horizontal base plate, spaced opposed moveable carriages mounted upon the base and having wheels to engage the base plate, upstanding longitudinal guides mounted upon the base plate outwardly of the wheels to guide the same, a central upstanding flange secured to the base plate and arranged between the carriages, each carriage including upstanding sides and an outer end provided with an opening, the carriages also having spaced inner walls disposed laterally inwardly of the upstanding sides, a screw threaded nut mounted upon each end adjacent to the opening thereof and held against rotation, an operating rod mounted upon the carriages and connecting them and having oppositely screw threaded portions extending through the openings of the ends and engaging the screw threaded nuts, one end of the operating rod extending outwardly beyond one carriage, and turnable to move the carriages toward and away from each other, oppositely arranged spaced pairs of crossed relatively long lifting arms having their lower ends arranged between the upstanding sides and inner walls and pivotally supported thereby, a substantially horizontal relatively long lifting platform including depending side flanges and a central depending flange and adapted to be supported by the lifting arms, the upper ends of the lifting arms being pivotally connected to the depending side flanges, and a single vertical group of crossed lazy tong levers arranged between the pairs of lifting arms and having their upper ends pivotally connected to the central depending flange and their lower ends pivotally connected to the central upstanding flange.

HARALD H. HODGIN.

REFERENCES CITED

The following references are of record in the file of this patent:

UNITED STATES PATENTS

| Number | Name | Date |
|---|---|---|
| 391,141 | Golightly et al. | Oct. 16, 1888 |
| 1,545,223 | Westrate | July 7, 1925 |
| 2,182,705 | Rissane | Dec. 5, 1939 |

FOREIGN PATENTS

| Number | Country | Date |
|---|---|---|
| 6,178 | Great Britain | of 1903 |